United States Patent [19]

Junya

[11] 4,311,896
[45] Jan. 19, 1982

[54] HEATING APPARATUS FOR ANNULAR BEARINGS AND RINGS

[75] Inventor: Seta Junya, Kishiwada, Japan

[73] Assignee: Yugen Kaisha Parusu Giken, Kishiwada, Japan

[21] Appl. No.: 144,936

[22] Filed: Apr. 29, 1980

[30] Foreign Application Priority Data

Jun. 4, 1979 [JP] Japan .................. 54-76394[U]
Nov. 5, 1979 [JP] Japan ................. 54-153317[U]

[51] Int. Cl.³ .................. H05B 6/14; H05B 6/38
[52] U.S. Cl. .................... 219/10.57; 219/10.67; 219/10.75; 219/10.79
[58] Field of Search ........... 219/10.57, 10.79, 10.67, 219/10.75, 10.71, 10.77

[56] References Cited

U.S. PATENT DOCUMENTS 2,457,179 12/1948 Ronay ..................... 219/10.79
3,187,155  6/1965 Beckert et al. ........... 219/10.75
3,525,842  8/1970 Steinhoff et al. ......... 219/10.57
3,764,767 10/1973 Randolph ............... 219/10.57 X
4,082,936  4/1978 Aoki et al. ............. 219/10.79 X Primary Examiner—Gene Z. Rubinson
Assistant Examiner—Philip H. Leung
Attorney, Agent, or Firm—Wenderoth, Lind & Ponack

[57] ABSTRACT

The present invention is related to a heating apparatus for rings or the like. A U-shaped core is placed in a case such that the ends of the two core legs can project therethrough. A primary coil is placed around a portion of the core that is within the case. A ring or the like which is to be heated and expanded is placed over the one core leg such that it rests on the outside of the casing, and a bridging core is then placed on the two legs such that the legs are bridged and thereby a loop core is formed. The core is energized causing the ring to be heated due to the electrical resistance therein. The bridging core is readily attachable and removable from the legs thereby enabling a ring to be easily placed onto and removed from the apparatus. Further, in some embodiments an adjustment means is provided to enable the core to be radially or vertically adjustable.

2 Claims, 5 Drawing Figures

(a)

(b)

(c)

(d)

HEATING APPARATUS FOR ANNULAR BEARINGS AND RINGS

BACKGROUND AND SUMMARY OF THE INVENTION

The present invention relates to a heating apparatus for rings, annular bearings, or the like which, due to mechanical specification, are required to be interference, force, or substantially closely fitted to a corresponding structure.

Such rings can be force fitted by hammering, etc. which can result in the damaging of the ring and/or the corresponding shaft. Alternatively, the ring can be relatively easily fitted by heating it and thereby causing its internal diameter to expand making the operation relatively troublesome.

Heretofore, there have been various apparatuses introduced to accomplish this ring expansion by heating, however, they are comparatively large, expensive and time consuming in operation because of the necessity of heating oil or the like and immersing the ring therein.

In view of the above-mentioned facts, it is an object of the present invention to provide a heating apparatus which is relatively compact, easy to operate and handle, effective, and efficient.

BRIEF DESCRIPTION OF THE PREFERRED EMBODIMENTS

The invention is explained in detail hereunder with reference to the accompanying drawings in which.

DETAILED DESCRIPTION OF THE INVENTION

The following elements of the Preferred Embodiments are respectively represented by the following reference numbers:
1: Case; 2: Primary coil; 3: Iron core; 4,4':
Extension legs; 5: Short-circuit bridging iron core; 7: Ring; 12: Guide; and 13: Lever.

Figure 1:
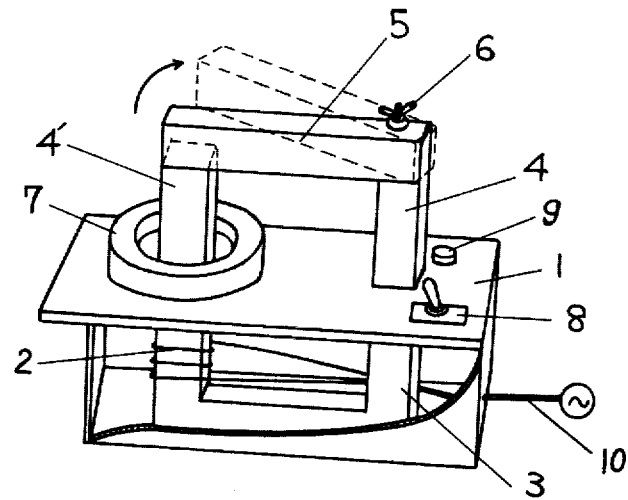
FIG. 1 is a partially cutaway perspective view of the first embodiment.

FIG. 1 shows the first embodiment of the present invention in which an iron core 3 has a primary coil 2 wound around the outside periphery of the core 3 and both are placed in a case 1 made of insulating material. As shown by the FIG., the iron core 3 is U-shaped with the open end facing upward and the legs protruding out of the case 1. The protruding legs define extension legs 4, 4' which are connected together by a short-circuit bridging iron core 5. The short-circuit iron core 5 is detachably connected to the iron core 3 by means of a bolt 6 thereby making a loop core from the cores 3 and 5.

The short-circuit iron bore 5, indicated by the broken lines of FIG. 1, is shown turned aside with the bolt 6 loosened thereby forming an open loop core. While in this configuration, a ring 7 which is to be heated, is inserted around the extension leg 4' such that the ring 7 is placed on an upper covering portion of the case 1.

It is noted herein that 8 is an operating switch, 9 is a pilot lamp, and 10 is a lead wire for the primary coil which is connected with AC electric supply source.

Now, as shown by FIG. 1, after the ring 7 is inserted, the short-circuit core 5 is secured thus connecting the extension legs 4 and 4'. When the switch 8 is activated, the magnetic flux generated by primary coil 2 conducts through the ring 7. Therefore, the ring 7 is heated because it is electrically conductive and thereby becomes a secondary coil with the induced current generating heat due to the electrical resistance of the ring 7. With the aid of a temperature sensing device functioning to deactivate the switch 8 when ring 7 reaches a predetermined temperature or of a timing device functioning to deactivate the switch 8 after a predetermined time, the heated ring 7 can be removed and subsequently inserted onto a shaft, and the insertion of the ring being quite easy due to its thermal expansion. It is noted herein that such temperature sensing devices and/or timing devices are commonly known to those skilled in the art, and these devices or their equivalents individually form no part of the present invention.

As seen from above-mentioned embodiments, the present invention includes the feature of the induced heating of an annular bearing or ring, and the heating apparatus is of extremely simple construction which facilitates easy handling. Further, when compared with a conventional apparatus which requires oil or its equivalent to be brought to a high temperature for a substantial length of time, the apparatus of the present invention, in which only rings are heated for a short period of time, is very economical, particularly in cases where a small number of heated objects are required. Additionally, the present invention includes a safety feature in that no fire element or continuous heating of oil, etc. is required.

Figure 2:
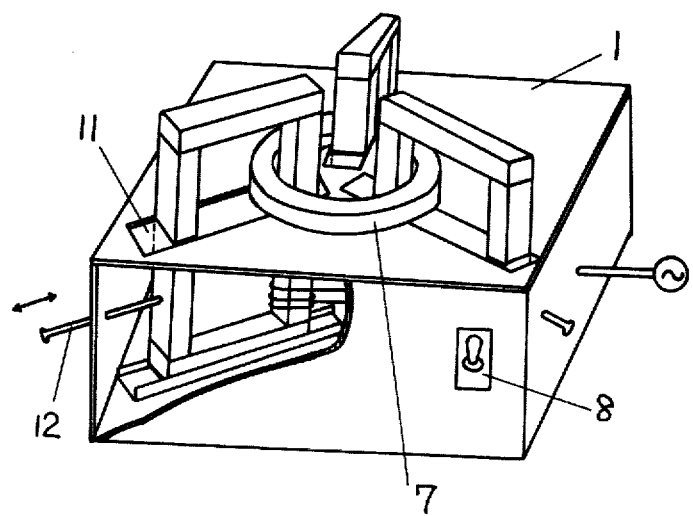
FIG. 2 is a partially cutaway perspective view of the second embodiment.

FIG. 2 shows another embodiment wherein three iron cores 3 respectively have a primary coil 2 wound about their outer periphery and subsequently placed in a case 1. Respectively, both ends of the iron cores 3 are free and extend out of the case 1 thereby forming respective extension legs 4 and 4'. Short-circuit cores 5 bridge the respective end portions of the iron cores 3 thereby forming loop cores. As shown by FIG. 2, the three loop cores can be formed in the radial direction such that one of the legs 4 of each core is located within the center of the case 1. To accommodate the cores within the casing, the upper covering portion of the case 1 has elongated slits 11 extending in the radial direction with one end of the respective slits 11 located at the center of the case. The slits are of such dimension that each loop core is able to move within the respective slit 11. Further, in order to stabilize each loop core, respective guides 12 are extended through the sides of the casing and abut the extension part 4' of each core 3. Each guides 12 is radially movable, as shown by the arrow in FIG. 2, such that the cores 3 can be adjustably positioned to accommodate rings of varying inner diameters.

Figure 3:
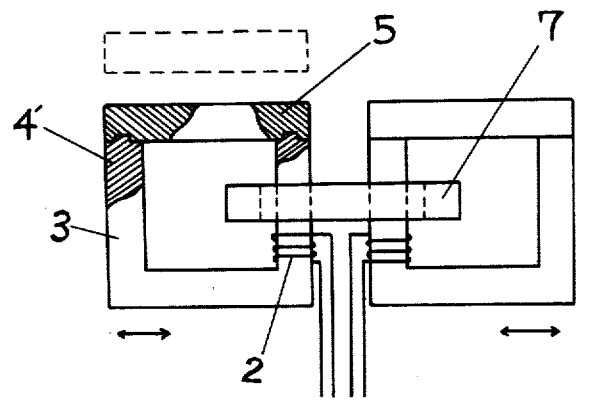
FIG. 3 is a partial side elevational view of the principal parts of the second embodiment.

FIG. 3 shows another embodiment of the bridging iron core 5 and the iron core 3. In particular, the extension legs 4 and 4' have projections on their ends which are dimensioned to respectively fit downwardly facing grooves in the bridging iron core 5.

Figure 4:
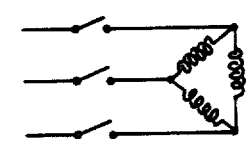
FIG. 4 shows several wiring diagrams illustrating various electrical connections for the present invention.
Figure 4:
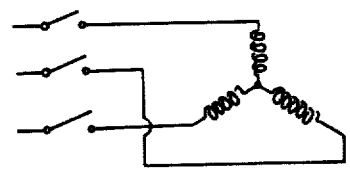
Figure 4:
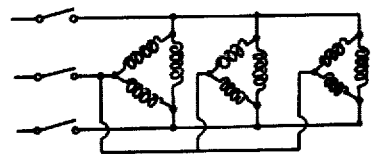
Figure 4:
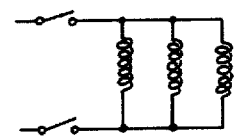

FIG. 4 shows several wiring schemes for the electrical connection of the primary coils to the power source. FIG. 4 (a) (b) and (c) are directed to a scheme whereby a 3 phase AC power source is connected to the coils.

Specifically, (a) shows a delta connection, (b) shows a Y connection, and (c) shows a complex delta connection. (d) shows a parallel connection of the primary coils to a single phase AC power source.

The operation of the invention is as follows. The ring 7 is inserted around the extension legs 4' of each core 3. The short-circuit bridge core 5 is removed and reconnected before and after the insertion of each ring. Then, by means of the guide lever 12 abutting the extension legs 4' of each core, each loop core is brought as closely and as uniformly as possible towards the center of the ring 7.

Subsequently, the switch 8 is activated, and the ring 7 is excited as a secondary coil by the induced current as previously described. Therefore, rings can be heated effectively and efficiently regardless of their size.

In the first embodiment, the core 3 is not adjustable as previously described; and therefore, if the radial distance between the ring and the extension leg 4' is substantial, the heating efficiency substantially decreases because of a magnetic leakage increase. In the second embodiment, the aforementioned problem is eliminated as it is possible to adjust each core 3 with respect to its radial position.

Further, by utilizing a 3 phase AC power source, it is possible to increase the electrical output efficiency which results in a high stability of operation of the present invention.

It is to be understood that the number of loop cores provided in the various embodiments are merely by way of illustration and that any number of loops cores could be provided while not departing from the scope of this invention.

Figure 5:
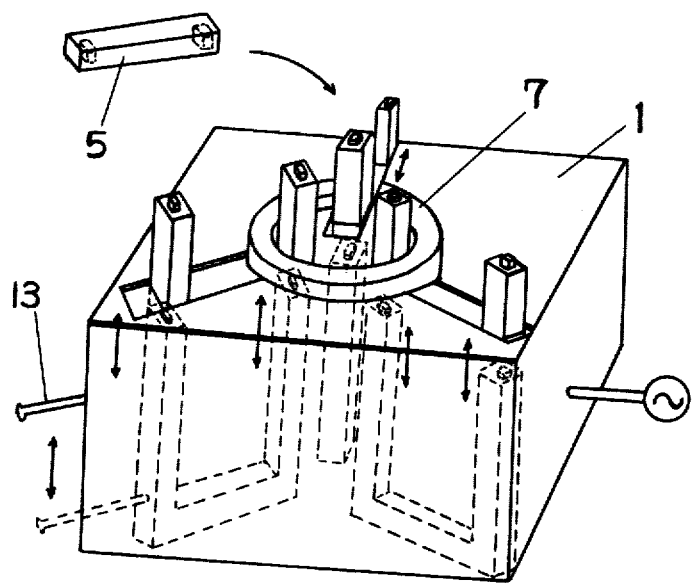
FIG. 5 is a perspective view of the third embodiment.

FIG. 5 shows another embodiment wherein by means of a lever 13 it is possible to vertically position the loop cores from outside of the case 1, as shown by the arrow, whereby when the cores are moved downwardly, the iron cores 3 will be housed completely within case 1 with the inserted ring remaining on the upper covering portion of case 1.

According to this embodiment, there is an additional feature in that the rings can be deexcited when the cores 3 are moved downwardly within the case when electric current is energizing the primary coil. Furthermore, when there are no rings around the cores 3 and the loop cores are in the downward position, the apparatus becomes compact in that there are no objects projecting from the case such that the apparatus is now handy for storing and carrying.

The present invention has been fully explained with reference to the three embodiments described herein, but the invention is not limited in its application or scope by these embodiments for one skilled in the art could utilize various other embodiments without departing from the scope and spirit of the present invention. Accordingly, the scope of the present invention is defined by the appended claims.

What is claimed:

1. A heating apparatus for an annular ring, said apparatus comprising:
   a plurality of U-shaped iron cores;
   a case for housing said U-shaped cores, said case having a top portion for allowing an annular ring to be heated to be placed thereon, said top portion having at least one opening therein, said at least one opening being dimensioned such that the respective legs of said cores can freely extend therethrough;
   said U-shaped cores being positioned in said case such that the legs of each of said U-shaped cores are radially aligned with respect to the center of said case and extend upwardly, the free end portion of each leg extending through and projecting outwardly from said at least one opening such that at least one leg of each of said U-shaped cores extends through the center area of an annular ring positioned on said top portion;
   said U-shaped cores being movable in the radial direction;
   at least one leg of each of said U-shaped cores having a primary coil therearound, said primary coil being positioned within said case;
   each of said U-shaped cores having an iron bridging core which is detachably connected to the outwardly projecting portion of each leg whereby a loop core is formed; and
   a voltage source means connected to said primary coil whereby an annular ring positioned on said top portion and around a leg of a U-shaped core is energized.

2. A heating apparatus as claimed in claim 1, wherein:
   said at least one opening is further dimensioned such that each of said U-shaped cores with said bridging core connected thereto can extend therethrough; and
   said U-shaped cores are movable in the vertical direction whereby each of said U-shaped cores with said bridging core connected thereto can completely retract to a position within said case.

* * * * *